(12) United States Patent
Loehr et al.

(10) Patent No.: US 11,653,391 B2
(45) Date of Patent: *May 16, 2023

(54) PERFORMING A TWO-STEP RANDOM ACCESS CHANNEL PROCEDURE

(71) Applicant: Lenovo (Singapore) PTE. LTD., New Tech Park (SG)

(72) Inventors: Joachim Loehr, Wiesbaden (DE); Alexander Johann Maria Golitschek Edler von Elbwart, Darmstadt (DE); Prateek Basu Mallick, Dreieich (DE); Ravi Kuchibhotla, Chicago, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/515,770

(22) Filed: Nov. 1, 2021

(65) Prior Publication Data

US 2022/0132588 A1 Apr. 28, 2022

Related U.S. Application Data

(63) Continuation of application No. 16/584,249, filed on Sep. 26, 2019, now Pat. No. 11,166,319.

(60) Provisional application No. 62/736,928, filed on Sep. 26, 2018.

(51) Int. Cl.
*H04W 74/08* (2009.01)
*H04W 76/11* (2018.01)
(Continued)

(52) U.S. Cl.
CPC ....... *H04W 74/0833* (2013.01); *H04L 5/0094* (2013.01); *H04W 72/0446* (2013.01); *H04W 76/11* (2018.02); *H04W 80/02* (2013.01)

(58) Field of Classification Search
CPC ..... H04L 5/0094; H04W 80/02; H04W 76/11; H04W 72/0446
See application file for complete search history.

(56) References Cited

U.S. PATENT DOCUMENTS 10,477,592 B2 11/2019 Zhang et al.
10,568,130 B2 2/2020 Wang et al.
(Continued)

OTHER PUBLICATIONS

3GPP, "3rd Generation Partnership Project; Technical Specification Group Radio Access Network; NR; Medium Access Control (MAC) protocol specification (Release 15)", 3GPP TS 38.321 V15.2.0, Jun. 2018, pp. 1-73.
(Continued)

*Primary Examiner* — Rasheed Gidado
(74) *Attorney, Agent, or Firm* — Kunzler Bean & Adamson

(57) ABSTRACT

Apparatuses, methods, and systems are disclosed for performing a two-step random access channel procedure. One method includes determining whether to perform a two-step random access channel procedure or a four-step random access channel procedure. The method includes, in response to determining to perform the two-step random access channel procedure: in a first step: transmitting a preamble in a first time slot; and transmitting an uplink data transmission via a physical uplink shared channel in a second time slot different from the first time slot; and, in a second step, receiving a response message corresponding to the first step, wherein the response message comprises a radio network temporary identifier.

20 Claims, 8 Drawing Sheets

(51) Int. Cl.
*H04L 5/00* (2006.01)
*H04W 72/04* (2009.01)
*H04W 80/02* (2009.01)
*H04W 72/0446* (2023.01)

(56) References Cited

U.S. PATENT DOCUMENTS

| | | | |
|---|---|---|---|
| 10,693,605 | B2 | 6/2020 | Islam et al. |
| 10,785,801 | B2 | 9/2020 | Li et al. |
| 10,848,287 | B2 * | 11/2020 | Jung .................. H04L 5/0051 |
| 10,917,879 | B2 | 2/2021 | Agiwal et al. |
| 2018/0049234 | A1 | 2/2018 | Lee et al. |
| 2018/0110074 | A1 * | 4/2018 | Akkarakaran .... H04W 74/0833 |
| 2018/0279375 | A1 * | 9/2018 | Jeon .................. H04W 74/0833 |
| 2019/0075599 | A1 | 3/2019 | Xia et al. |
| 2019/0364599 | A1 | 11/2019 | Islam et al. |
| 2019/0380071 | A1 | 12/2019 | Liu |
| 2019/0380154 | A1 | 12/2019 | Wei et al. |
| 2020/0100297 | A1 * | 3/2020 | Agiwal ................. H04W 52/50 |

OTHER PUBLICATIONS

3GPP, "3rd Generation Partnership Project; Technical Specification Group Radio Access Network; NR; Multiplexing and channel coding (Release 15)", 3GPP TS 38.212 V15.2.0, Jun. 2018, pp. 1-98.

3GPP, "3rd Generation Partnership Project; Technical Specification Group Radio Access Network; NR; Physical channels and modulation (Release)", 3GPP TS 38.211 V15.2.0, Jun. 2018, pp. 1-96.

3GPP, "3rd Generation Partnership Project; Technical Specification Group Radio Access Network; NR; Physical layer measurements (Release 15)", 3GPP TS 38.215 V15.2.0, Jun. 2018, pp. 1-15.

3GPP, "3rd Generation Partnership Project; Technical Specification Group Radio Access Network; NR; Physical layer procedures for control (Release 15)", 3GPP TS 38.213 V15.2.0, Jun. 2018, pp. 1-99.

3GPP, "3rd Generation Partnership Project; Technical Specification Group Radio Access Network; NR; Physical layer procedures for data (Release 15)", 3GPP TS 38.214 V15.2.0, Jun. 2018, pp. 1-95.

3GPP, "3rd Generation Partnership Project; Technical Specification Group Radio Access Network; NR; Radio Resource Control (RRC) protocol specification (Release 15)", 3GPP TS 38.331 V15.2.1, Jun. 2018, pp. 1-303.

LG-Electronics, "Considerations on 2-Step CBRA procedure for NR-U SA", R2-1812832, 3GPP TSG-RAN WG2 #103, Aug. 20-24, 2018, pp. 1-3.

Catt, "Consideration on 2-step RA", R2-1700205, 3GPP TSG RAN WG2 Meeting Ad Hoc, Jan. 17-19, 2017, pp. 1-6.

Huawei, "Discussion on Msg3 fallback in EDT", R2-1811821, 3GPP TSG-RAN WG2 Meeting #103, Aug. 20-24, 2018, pp. 1-2.

* cited by examiner

PERFORMING A TWO-STEP RANDOM ACCESS CHANNEL PROCEDURE

CROSS-REFERENCE TO RELATED APPLICATIONS

This application claims priority to U.S. patent application Ser. No. 16/584,249 filed on Sep. 26, 2019, which is a continuation of U.S. Patent Application Ser. No. 62/736,928 entitled "A RANDOM ACCESS PROCEDURE WITH A REDUCED NUMBER OF SIGNALING MESSAGES" and filed on Sep. 26, 2018 for Joachim Loehr, all of which are incorporated herein by reference in their entirety.

FIELD

The subject matter disclosed herein relates generally to wireless communications and more particularly relates to performing a two-step random access channel procedure.

BACKGROUND

The following abbreviations are herewith defined, at least some of which are referred to within the following description: Third Generation Partnership Project ("3GPP"), $5^{th}$ Generation ("5G"), Positive-Acknowledgment ("ACK"), Aggregation Level ("AL"), Access and Mobility Management Function ("AMF"), Access Point ("AP"), Beam Failure Detection ("BFD"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Data Radio Bearer ("DRB"), Discontinuous Reception ("DRX"), Downlink Pilot Time Slot ("DwPTS"), Enhanced Clear Channel Assessment ("eCCA"), Enhanced Mobile Broadband ("eMBB"), Evolved Node B ("eNB"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), 5G Node B or Next Generation Node B ("gNB"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MIME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Non-Orthogonal Multiple Access ("NOMA"), New Radio ("NR"), NR Unlicensed ("NR-U"), Network Repository Function ("NRF"), Network Slice Instance ("NSI"), Network Slice Selection Assistance Information ("NSSAI"), Network Slice Selection Function ("NS SF"), Network Slice Selection Policy ("NSSP"), Operation and Maintenance System ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), Primary Cell ("PCell"), Policy Control Function ("PCF"), Physical Cell ID ("PCID"), Physical Downlink Control Channel ("PDCCH"), Packet Data Convergence Protocol ("PDCP"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Physical Resource Block ("PRB"), Primary Secondary Cell ("PSCell"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Radio Access Technology ("RAT"), Random Access Procedure ("RACH"), Random Access Preamble Identifier ("RAPID"), Random Access Response ("RAR"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), System Information Block ("SIB"), SystemInformationBlockType1 ("SIB1"), SystemInformationBlock-Type2 ("SIB2"), Sub scriber Identity/Identification Module ("SIM"), Signal-to-Interference-Plus-Noise Ratio ("SINR"), Service Level Agreement ("SLA"), Session Management Function ("SMF"), Special Cell ("SpCell"), Single Network Slice Selection Assistance Information ("S-NSSAI"), Signaling Radio Bearer ("SRB"), Shortened TTI ("sTTI"), Synchronization Signal ("SS"), Synchronization Signal Block ("SSB"), Supplementary Uplink ("SUL"), Subscriber Permanent Identifier ("SUPI"), Timing Advance ("TA"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Uplink ("UL"), UL SCH ("UL-SCH"), Universal Mobile Telecommunications System ("UMTS"), User Plane ("UP"), Uplink Pilot Time Slot ("UpPTS"), Ultra-reliability and Low-latency Communications ("URLLC"), UE Route Selection Policy ("URSP"), Visiting AMF ("vAMF"), Visiting NSSF ("vNSSF"), Visiting PLMN ("VPLMN"), and Worldwide Interoperability for Microwave Access ("WiMAX").

In certain wireless communications networks, a RACH procedure may be used. In such networks, the RACH procedure may take longer than desired.

BRIEF SUMMARY

Methods for performing a two-step random access channel procedure are disclosed. Apparatuses and systems also perform the functions of the methods. One embodiment of a method includes determining whether to perform a two-step random access channel procedure or a four-step random access channel procedure. In some embodiments, the method includes, in response to determining to perform the two-step random access channel procedure: in a first step: transmitting a preamble in a first time slot; and transmitting an uplink data transmission via a physical uplink shared channel in a second time slot different from the first time slot; and, in a second step, receiving a response message corresponding to the first step, wherein the response message comprises a radio network temporary identifier.

One apparatus for performing a two-step random access channel procedure includes a processor that determines whether to perform a two-step random access channel procedure or a four-step random access channel procedure. In various embodiment, the apparatus includes a transmitter. In certain embodiments, the apparatus includes a receiver. In some embodiments, in response to determining to perform the two-step random access channel procedure: in a first step, the transmitter: transmits a preamble in a first time slot; and transmits an uplink data transmission via a physical uplink shared channel in a second time slot different from the first time slot; and in a second step, the receiver receives a response message corresponding to the first step, wherein the response message comprises a radio network temporary identifier.

Another embodiment of a method for performing a two-step random access channel procedure includes receiving a preamble in a first time slot and receiving an uplink data transmission via a physical uplink shared channel in a second time slot different from the first time slot in response to a determination by a remote unit to perform a two-step random access channel procedure. In some embodiments, the method includes transmitting a response message corresponding to the preamble and the uplink data transmission, wherein the response message comprises a radio network temporary identifier.

One apparatus for performing a two-step random access channel procedure includes a receiver that receives a preamble in a first time slot and receiving an uplink data transmission via a physical uplink shared channel in a second time slot different from the first time slot in response to a determination by a remote unit to perform a two-step random access channel procedure. In certain embodiments, the apparatus includes a transmitter that transmits a response message corresponding to the preamble and the uplink data transmission, wherein the response message comprises a radio network temporary identifier.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
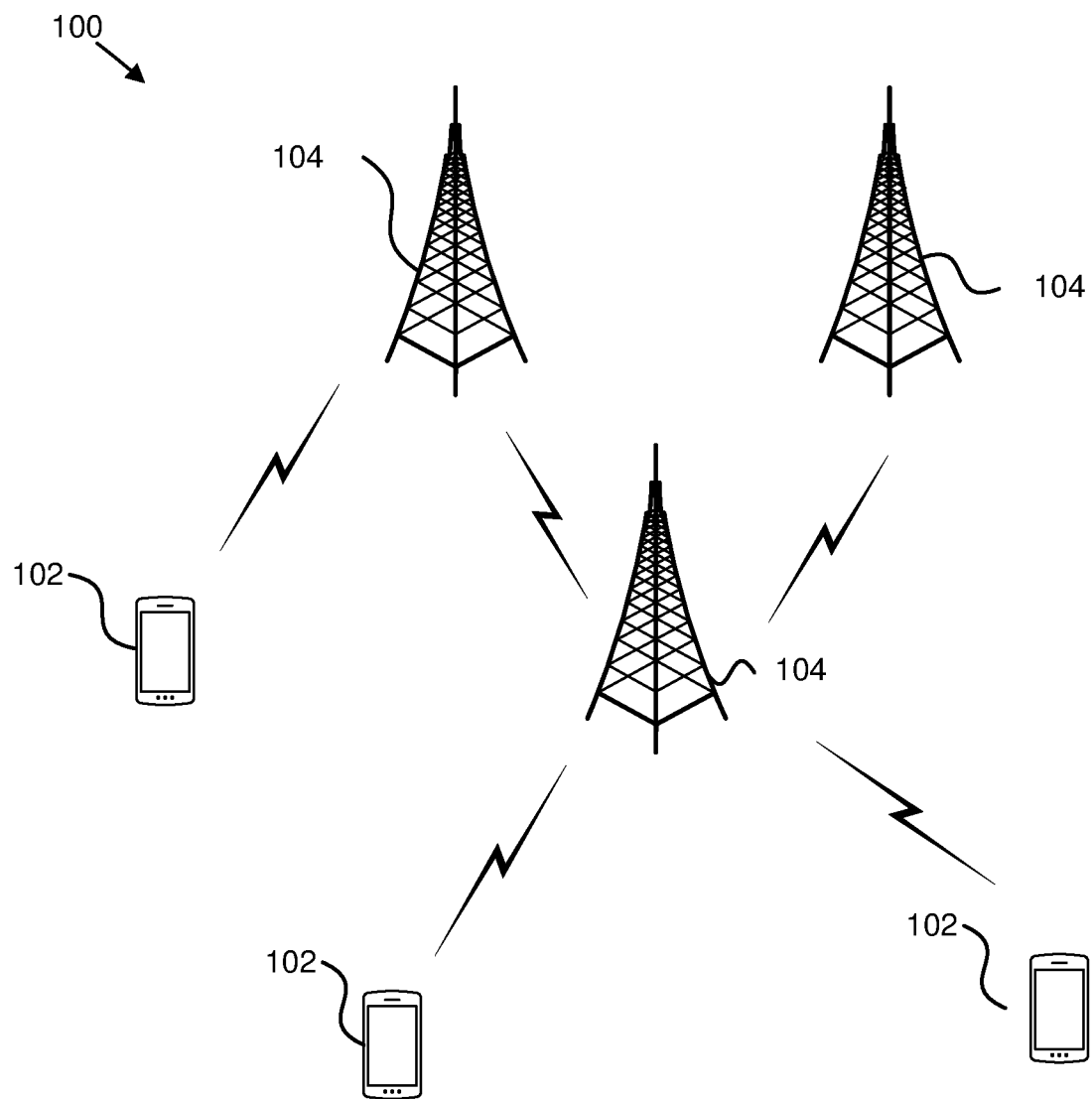
FIG. 1 is a schematic block diagram illustrating one embodiment of a wireless communication system for performing a two-step random access channel procedure.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for performing a two-step random access channel procedure. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may determine whether to perform a two-step random access channel procedure or a four-step random access channel procedure. In some embodiments, the remote unit 102 may, in response to determining to perform the two-step random access channel procedure: in a first step: transmit a preamble in a first time slot; and transmit an uplink data transmission via a physical uplink shared channel in a second time slot different from the first time slot; and, in a second step, receive a response message corresponding to the first step, wherein the response message comprises a radio network temporary identifier. Accordingly, the remote unit 102 may be used for performing a two-step random access channel procedure.

In certain embodiments, a network unit 104 may receive a preamble in a first time slot and receiving an uplink data transmission via a physical uplink shared channel in a second time slot different from the first time slot in response to a determination by a remote unit to perform a two-step random access channel procedure. In some embodiments, the network unit 104 may transmit a response message corresponding to the preamble and the uplink data transmission, wherein the response message comprises a radio network temporary identifier. Accordingly, the network unit 104 may be used for performing a two-step random access channel procedure.

Figure 2:
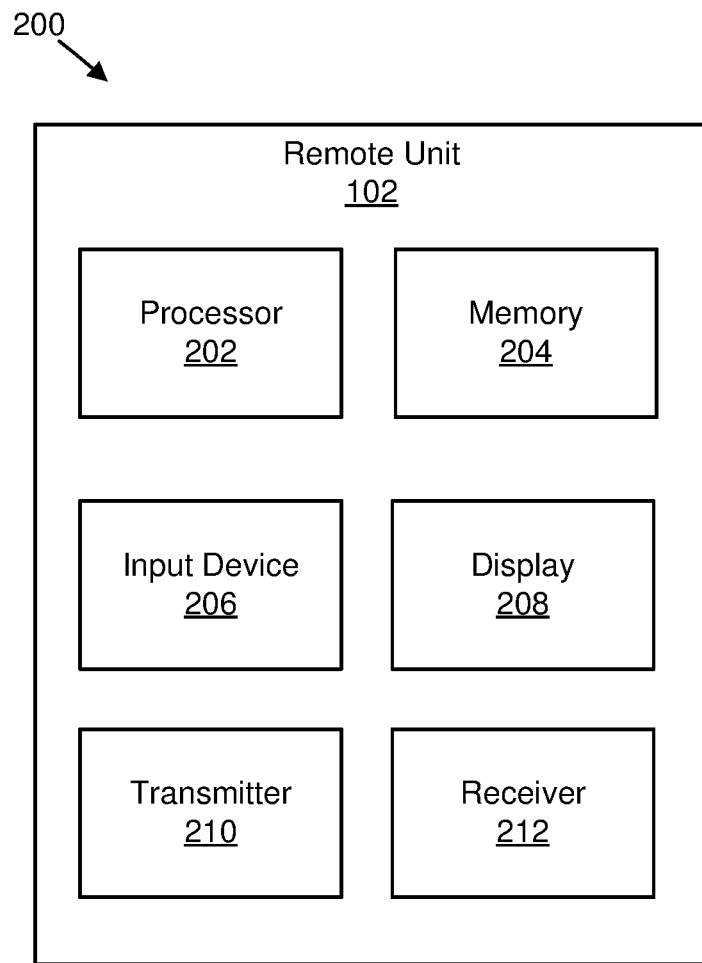
FIG. 2 is a schematic block diagram illustrating one embodiment of an apparatus that may be used for performing a two-step random access channel procedure.

FIG. 2 depicts one embodiment of an apparatus 200 that may be used for performing a two-step random access channel procedure. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may determine whether to perform a two-step random access channel procedure or a four-step random access channel procedure. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In some embodiments, in response to determining to perform the two-step random access channel procedure: in a first step, the transmitter 210: transmits a preamble in a first time slot; and transmits an uplink data transmission via a physical uplink shared channel in a second time slot different from the first time slot; and in a second step, the receiver 212 receives a response message corresponding to the first step, wherein the response message comprises a radio network temporary identifier. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
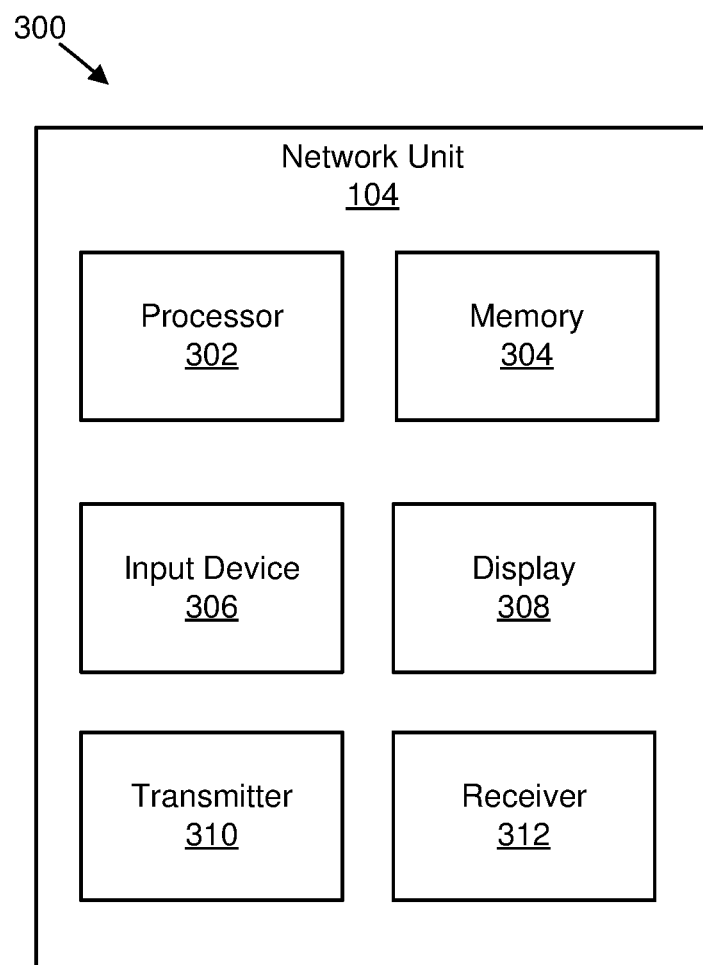
FIG. 3 is a schematic block diagram illustrating one embodiment of an apparatus that may be used for performing a two-step random access channel procedure.

FIG. 3 depicts one embodiment of an apparatus 300 that may be used for performing a two-step random access channel procedure. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 receives a preamble in a first time slot and receives an uplink data transmission via a physical uplink shared channel in a second time slot different from the first time slot in response to a determination by a remote unit to perform a two-step random access channel procedure. In some embodiments, the transmitter 310 transmits a response message corresponding to the preamble and uplink data transmission, wherein the response message comprises a radio network temporary identifier. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain configurations, a CBRA procedure involves the exchange of four messages. In such configurations, when performing a RACH procedure on an unlicensed cell, each of the four messages exchanged during the RACH procedure may undergo a CCA procedure before a transmission may be made on the unlicensed cell. To reduce time for the RACH procedure, a 2-step RACH procedure may be used.

Certain details of a 2-step RACH procedure may include: 1) a format and/or content of a response message (e.g., in step 2 of the 2-step RACH procedure); 2) power control issues for a preamble and an uplink transmission in step 1 of the 2-step RACH procedure; 3) uplink timing for a PUSCH transmission and a preamble transmission in step 1 of the 2-step RACH procedure; 4) switching between a 2-step RACH procedure and a 4-step RACH procedure; and/or 5) resource allocation for an uplink transmission in step 1 of the 2-step RACH procedure.

Figure 4:
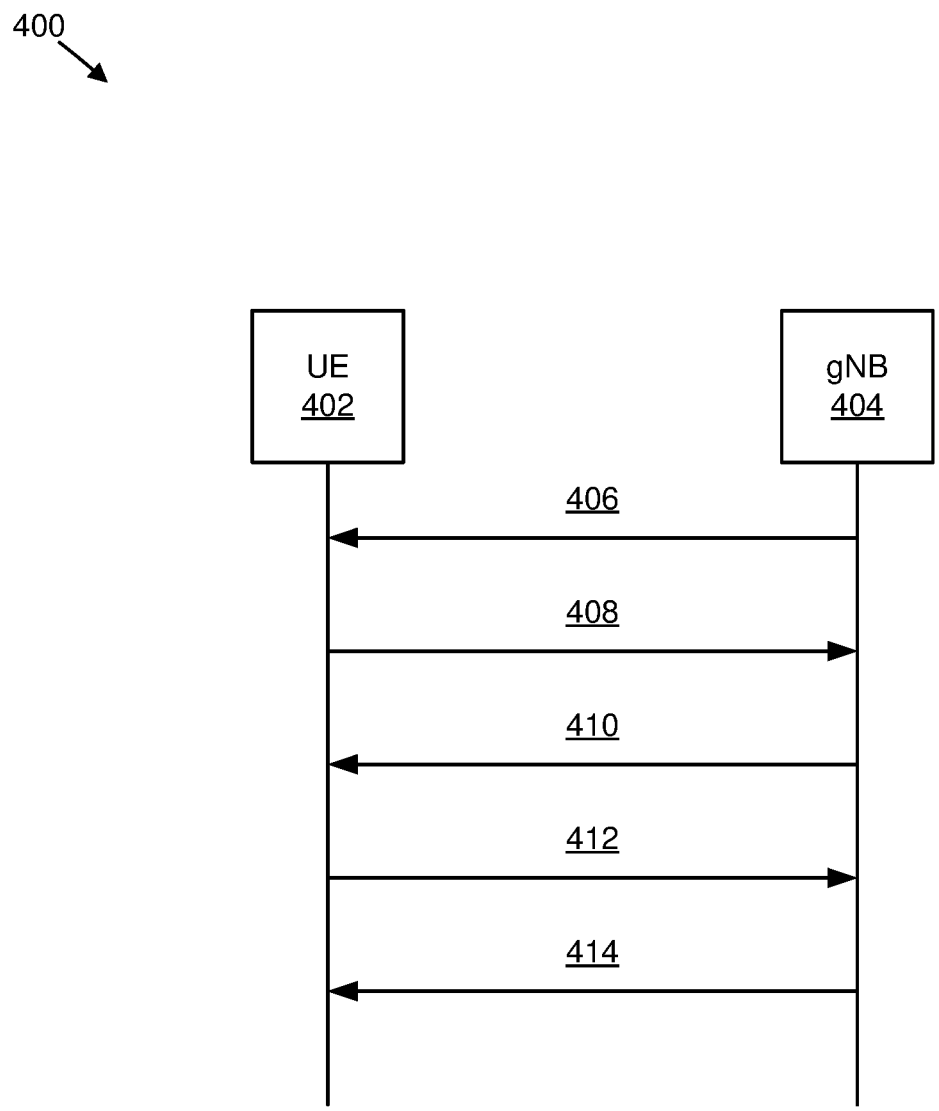
FIG. 4 is a communication diagram illustrating one embodiment of communications as part of a RACH procedure.

FIG. 4 is a communication diagram illustrating one embodiment of communications 400 as part of a RACH procedure (e.g., 4-step RACH procedure). The communications 400 occur between a UE 402 (e.g., remote unit 102) and a gNB 404 (e.g., network unit 104, gNB). As may be appreciated, each of the communications 400 described herein may include one or more messages.

In one embodiment, in a first communication 406 transmitted from the gNB 404 to the UE 402, the gNB 404 transmits a SIB to the UE 402. In certain embodiments, in a second communication 408 transmitted from the UE 402 to the gNB 404, the UE 402 transmits a PRACH preamble to the gNB 404. In some embodiments, in a third communication 410 transmitted from the gNB 404 to the UE 402, the gNB 404 transmits a RAR to the UE 402.

In various embodiments, in a fourth communication 412 transmitted from the UE 402 to the gNB 404, the UE 402 transmits an uplink transmission on the PUSCH, e.g. connection request message to the gNB 404. In one embodiment, in a fifth communication 414 transmitted from the gNB 404 to the UE 402, the gNB 404 transmits a contention resolution message to the UE 402.

As may be appreciated, FIG. 4 shows CBRA. It should be noted that CFRA does not include the fourth communication 412 and the fifth communication 414. In some embodiments, in CFRA a UE may be allocated a RACH preamble and/or RACH resource (e.g., by means of a PDCCH order) that makes a need for a contention resolution obsolete. An RAR message may have the same content for CBRA and CFRA. As may be appreciated, a CFRA may be used for HO, uplink timing alignment, and beam failure recovery, for example.

As may be appreciated, various embodiments described herein may be applied to CBRA. Moreover, embodiments described herein may be described in the context of an unlicensed transmission and/or cell (e.g., NR-U); however, the embodiments herein may also be applicable to licensed cells (e.g., NR or LTE).

Figure 5:
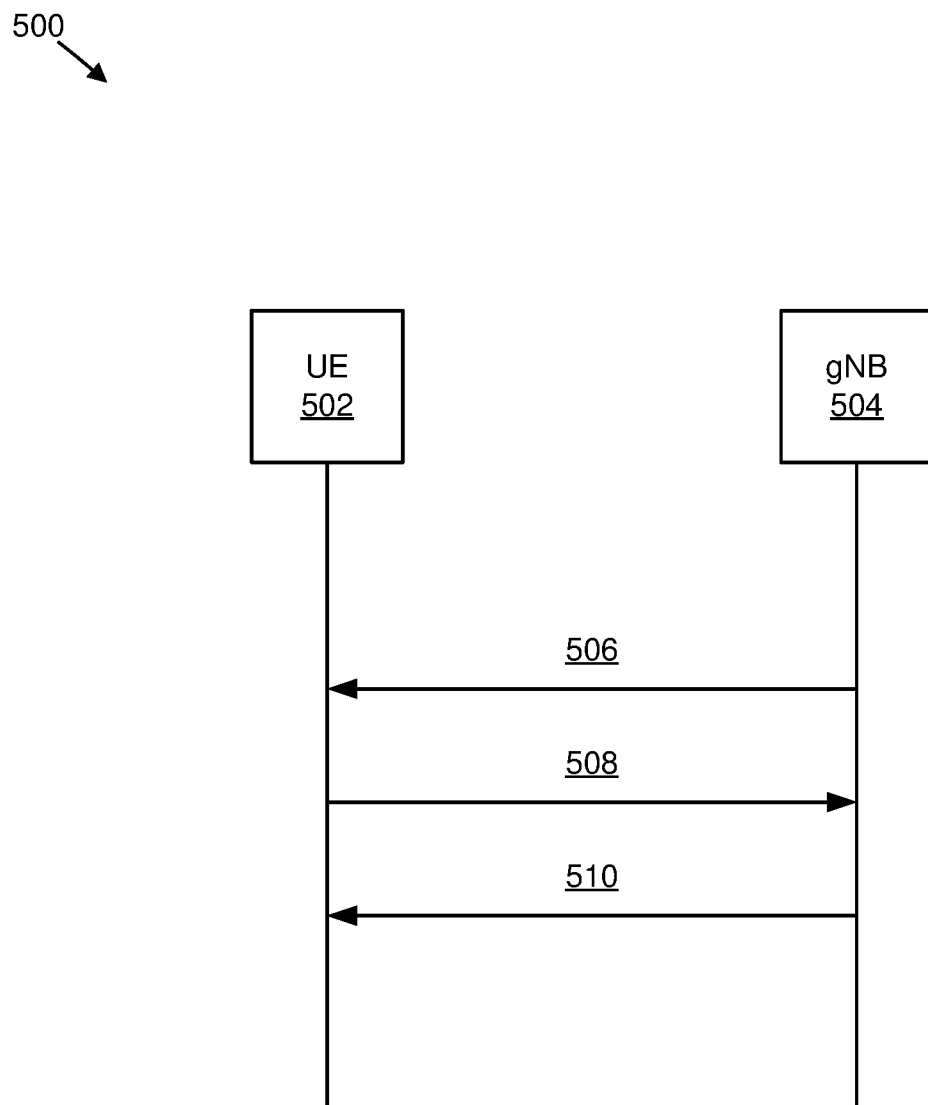
FIG. 5 is a communication diagram illustrating another embodiment of communications as part of a RACH procedure.

FIG. 5 is a communication diagram illustrating another embodiment of communications 500 as part of a RACH procedure (e.g., 2-step RACH procedure). The communications 500 occur between a UE 502 (e.g., remote unit 102) and an gNB 504 (e.g., network unit 104, gNB). As may be appreciated, each of the communications 500 described herein may include one or more messages.

In one embodiment, in a first communication 506 transmitted from the gNB 504 to the UE 502, the gNB 504 transmits a SIB to the UE 502. In certain embodiments, in a second communication 508 (e.g., first step in the 2-step RACH procedure, msg1 and msg3 of the 4-step RACH procedure) transmitted from the UE 502 to the gNB 504, the UE 502 transmits a PRACH preamble to the gNB 504 and an uplink transmission (e.g., on PUSCH). In some embodiments, in a third communication 510 transmitted from the gNB 504 to the UE 502, the gNB 504 transmits a RAR and a contention resolution message to the UE 502 (e.g., second step in the 2-step RACH procedure, msg2 and msg4 of the 4-step RACH procedure).

In one embodiment, a UE, after having sent in a first step of a 2-step RACH procedure a preamble-like signal and an initial uplink transmission (e.g., on PUSCH), monitors for one or more response messages (e.g., in a second step of the 2-step RACH procedure) sent from a gNB. In such an embodiment, the UE may monitor for the one or more response messages during a defined time period (e.g., time window). In such an embodiment, the UE monitors during the time window for a PDCCH identified by an RA-RNTI scheduling PDSCH resources on which the one or more response messages are transmitted.

In some embodiments, an initial uplink transmission transmitted in a first step of the 2-step RACH procedure may include a TB containing at least a UE identifier such as a C-RNTI MAC control element or a UL CCCH SDU. In such embodiments, the TB may contain data of a data radio bearer or control information such as a BSR or a PHR.

In various embodiments, a response message (e.g., in step 2 of a 2-step RACH procedure) sent from a network device (e.g., gNB) in response to the successful detection of a preamble-like signal (e.g., sent in step 1 of the 2-step RACH procedure together with an initial uplink transmission) contains a random access preamble identifier field identifying a preamble received. In such embodiments, the response message may contain a TA Value that the gNB uses to inform the UE to change its timing so it may compensate for a round trip delay caused by the UE distance from the gNB. In certain embodiments, the response message may include an UL grant field within which a gNB may schedule a retransmission of a transport block transmitted in step-1 of a 2-step RACH procedure or a new initial uplink transmission. In some embodiments, if a TB and/or uplink transmission sent in a first step of a 2-step RACH procedure along with a preamble-like signal are detected but not correctly decoded by a gNB, the gNB may schedule a retransmission of the TB. In such embodiments, because the TB may contain an identifier identifying a UE, the gNB may decode the TB as soon as possible to resolve a potential contention. In such embodiments, if the TB sent in the first step cannot be correctly decoded by the gNB, the gNB may schedule an additional uplink transmission within the response message. In such embodiments, if the TB sent in the first step can be correctly decoded by the gNB, the gNB may schedule a further initial uplink transmission within the response message. In certain embodiments, a HARQ process used for the transmission of an uplink transmission (e.g., on PUSCH) in step 1 of a 2-step RACH procedure may be predefined, preconfigured, and/or fixed in a standard. It should be noted that an UL grant contained within a response message (e.g., in step 2 of a 2-step RACH procedure) may allocate multiple uplink resources for an initial transmission or retransmission (e.g., for transmissions on an unlicensed cell).

In certain embodiments, depending on whether a TB containing an identifier sent in step 1 of a 2-step RACH procedure is successfully decoded by a gNB, a response message may contain an ID field echoing the identifier sent in step 1, thereby resolving a potential contention. For example, if an uplink transmission in step 1 containing a C-RNTI MAC CE (e.g., for UEs in an RRC_CONNECTED state having already a C-RNTI allocated) is successfully decoded, the response message may contain a C-RNTI MAC CE set to the same value as the C-RNTI MAC CE sent in step 1. Similarly, as another example, if an uplink transmission sent in step 1 containing a UL CCCH SDU (e.g., UE in an RRC_IDLE state) is successfully decoded, the response message may carry a UE contention resolution ID MAC CE (e.g., first 48 bits of the UL CCCH SDU transmitted in step 1). In some embodiments, if a TB sent in step 1 of a 2-step RACH procedure cannot be successfully decoded, a response message may not contain an identifier field (e.g., C-RNTI MAC CE or UE contention resolution ID MAC CE) because the identity of a UE is not known to a gNB. In such embodiments, a potential contention may not be resolved (e.g., one or more further retransmissions of the uplink transmission of step 1 is required).

In some embodiments, a response message may contain a temporary C-RNTI field that may include an identity assigned by a gNB for further communication. In such embodiments, the temporary C-RNTI field may only be present in the response message, such as if a TB sent in step 1 of a 2-step RACH procedure is not able to be successfully decoded or if the TB sent in step 1 contains a UL CCCH SDU (e.g., if a UE is in an RRC_IDLE state). In certain embodiments, if a UE in an RRC_CONNECTED state is performing a 2-step RACH procedure and a TB sent in step 1 of the 2-step RACH procedure is successfully decoded by a gNB, a C-RNTI field may not be used if the UE already has an assigned C-RNTI that is known to the gNB. In various embodiments, a temporary C-RNTI field is always present in a response message and a UE may ignore the temporary C-RNTI field upon reception of the response message if the identifier sent in the response message (e.g., temporary C-RNTI MAC CE) matches an ID sent in step 1 of the 2-step RACH procedure.

In one embodiment, a response message of a 2-step RACH procedure is transmitted within a RACH response message transmitted on a PDSCH (e.g., MAC PDU). In certain embodiments, a UE may monitor upon transmission of a preamble and an UL transmission during a RACH response window for a response message (e.g., PDCCH addressed to RA-RNTI calculated from a timeslot in which the preamble is sent). In some embodiments, a RAPID in a MAC subheader for a random access response indicates whether a corresponding MAC RAR is a legacy RAR or a new response message for a 2-step RACH. In various embodiments, certain fields in a MAC RAR (e.g., MAC payload for a random access response) identify a response for a 2-step RACH and a legacy random access response. For example, a reserved bit in a MAC RAR (e.g., see Table 1) may be used to indicate a format of the MAC RAR (e.g., response for 2-step RACH or a legacy RAR—4-step RACH RAR).

TABLE 1

MAC RAR

| R | R | R | Timing Advance Command |
|---|---|---|---|
| Timing Advance Command | | | UL Grant |
| | UL Grant | | |
| | UL Grant | | |
| | UL Grant | | |
| | Temporary C-RNTI | | |
| | Temporary C-RNTI | | |

In certain embodiments, a first reserved bit set to '1' indicates that a response for a 2-step RACH procedure is contained within the MAC RAR. In various embodiments, a format for a MAC RAR that includes a response for a 2-step RACH procedure may be different than a legacy MAC RAR format. In one embodiment, a response message for a 2-step RACH may schedule a retransmission of an uplink transmission made in step 1 of the 2-step RACH procedure. In such an embodiment, an indicator that distinguishes between an UL grant for a retransmission and an initial transmission may be contained in the UL grant field. In certain embodiments, a response message for a 2-step RACH procedure may contain a C-RNTI MAC CE or a UE contention resolution ID MAC CE (e.g., depending on a decoding status of a first uplink transmission and a UE RRC state). In various embodiments, a MAC RAR containing a response for 2-step RACH procedure may have a variable size. In one embodiment, extension bits may indicate a presence of a C-RNTI MAC CE or a UE contention resolution ID MAC CE. In certain embodiments, a response message for a 2-step RACH procedure may contain a DL allocation (e.g., either a DL TB or DL grant information pointing to PDSCH resources).

In various embodiments, a RNTI, e.g. RA-RNTI, used for identifying a response for a 2-step RACH procedure may be calculated differently (e.g., using a different formula) than the RA-RNTI used for a RAR of a legacy RACH procedure (e.g., 4-step RACH procedure). As used herein, a legacy RACH procedure may refer to a 4-step RACH procedure.

In some embodiments, in response to not receiving a response message in step 2 of a 2-step RACH procedure, a UE may repeat step 1 of the 2-step RACH procedure and may send a preamble-like signal together with an uplink transmission. In certain embodiments, a UE that does not successfully receive a response message within a defined time window may assume that a preamble was not detected by a gNB. In various embodiments, a UE transmits or retransmits a preamble and an uplink transmission sent previously in step 1 of a 2-step RACH procedure with an increased transmission power than a transmission power used for a previous transmission of the preamble and the uplink transmission (e.g., power ramping may be applied to both the preamble and the uplink transmission).

In one embodiment, a UE switches to a legacy 4-step RACH procedure in the absence of a response message during a defined time window. In some embodiments, if a UE doesn't successfully receive a response message for a 2-step RACH procedure, the UE switches to the legacy 4-step RACH procedure and subsequently transmits only a preamble (e.g., no UL transmission on PUSCH with the preamble). In various embodiments, a preamble transmission may be transmitted with an increased transmission power as compared to a previous preamble transmission (e.g., power ramping). In certain embodiments in which different preambles are used for a 2-step RACH procedure and a legacy 4-step RACH procedure, a UE may select a preamble reserved for the 4-step RACH procedure. In one embodiment, a UE stores a MAC PDU sent in step 1 of a 2-step RACH procedure in a Msg3 buffer if switching to a 4-step RACH procedure. In some embodiments, a new transmission buffer may be used in which a UE stores a MAC PDU sent in step 1 of a 2-step RACH procedure after generating the MAC PDU. As may be appreciated, storing a MAC PDU generated for step 1 in a separate buffer may enable later retransmissions of the generated MAC PDU (e.g., if contention resolution fails).

In certain embodiments, a UE transmits or retransmits a preamble together with an uplink (e.g., UL-SCH) transmission in the absence of a response message. In such embodiments, the UE may determine whether to apply power ramping (e.g., transmitting with an increased TX power compared to a previous transmission) for both the preamble and the uplink transmission or for only the preamble. In one embodiment, a UE calculates a required transmission power for both a preamble transmission $P_{preamble}$ using a power control formula specified for preamble transmission thereby assuming a predefined power offset and for an uplink transmission $P_{UL}$ using a power control formula specified for the uplink transmission to account for the predefined power offset. It should be noted that the predefined power offset, also referred to as Power_Ramping_Stepsize, may be separately defined for the preamble transmission and the uplink transmission. In certain embodiments, if a sum of a required transmission power for a preamble and an uplink transmission (e.g., including power offsets) does not exceed a UE's total maximum transmission power (e.g., $P_{CMAX,f,c}(i)$), power ramping may be applied to both the preamble and the uplink transmission. In various embodiments, if a sum of $P_{Preamble}$ including a power offset and $P_{UL}$ without consideration of a power offset doesn't exceed $P_{cmax,c}$, power ramping may only be applied to the preamble transmission. In some embodiments, if $P_{Preamble}$ including a power offset and $P_{UL}$ without consideration of a power offset exceeds $P_{CMAX,f,c}(i)$, a UE may switch to a legacy 4-step RACH procedure.

In one embodiment, a UE transmits a preamble-like signal and an uplink data transmission conveyed by PUSCH (e.g., elements forming step 1 in a 2-step RACH procedure) in different time slots. As may be appreciated, one benefit of transmitting the preamble-like signal and the uplink data transmission in different time slots may be that a power between the preamble-like signal and the uplink data transmission does not need to be shared so that both transmissions may operate at optimum coverage (e.g., optimal power). Further, it should be noted that another benefit of transmitting the preamble-like signal and the uplink data transmission in different time slots may be that a network node (e.g., gNB) may first detect the preamble-like transmission, and upon successful detection of the preamble-like transmission proceed to receive the uplink data transmission. Furthermore, transmitting the preamble-like signal and the uplink data transmission in different time slots may eliminate and/or reduce the need for precautionary buffering of a received time slot.

In some embodiments, different gNB implementations may need a different amount of time to successfully detect a preamble. Therefore, in one embodiment, a gNB may configure a time offset that a UE has to observe between a transmission of a preamble-like signal and a transmission of uplink data. In such an embodiment, the configuration may be advertised (e.g., in broadcast information in an SIB because all UEs may observe the same offset). In certain embodiments, an offset may depend on an employed subcarrier spacing (e.g., because a duration of a preamble-like signal may be a function of the subcarrier spacing) even though a required detection time may not scale equally. For example, in a first subcarrier spacing, an offset may be 1 slot, and in another subcarrier spacing the offset may be 2 slots. As may be appreciated, because it is possible that a gNB has sufficient capability to buffer a received signal, it may be beneficial if an offset can be 0 slots (e.g., implying that a preamble-like signal and an uplink data transmission occur in the same slot). In various embodiments, an offset of 1 slot may indicate that a UE is to transmit a preamble-like signal in slot n1, and an uplink data transmission in slot n2=n1+1. In other words, both transmissions are adjacent in time. As may be appreciated, this may be beneficial in an unlicensed carrier configuration in which the UE contends for channel access (e.g., where any gap may bear the risk of losing a right to transmit on a channel), or with interference from a hidden node.

In one embodiment, if an offset is larger than 1 slot and if a RACH procedure occurs on an unlicensed carrier, a UE may perform a clear channel assessment before transmission of uplink data. As may be appreciated, this may result in not being able to transmit the uplink data in a designated slot due to a blocked channel. In certain embodiments, a UE repeats a transmission of a preamble-like signal and uplink data for a number of consecutive slots based on an offset value. In some embodiments, if an offset value is n_o, then a UE may transmit and/or repeat a preamble-like signal during n_o slots followed by uplink data transmitted and/or repeated during n_o slots. Accordingly, there may be no gap from the UE's transmission point of view thereby eliminating (e.g., or reducing) a risk of losing a channel access prior to the uplink data transmission. From the gNB's perspective, if the gNB detects the preamble-like signal in slot n1, then the gNB may be able to receive an uplink data signal in slot n1+n_o.

In various embodiments, an offset may be set to a fixed value of 1 slot so that a preamble-like transmission and uplink data transmission occur in adjacent slots. As may be appreciated, this does not require a configuration of an offset value and, therefore, uses less overhead than configurations in which the offset is configured via a message and/or signaling.

In some embodiments, if a transmission of a preamble-like signal and uplink data occur in the same slot, available transmit power of a UE may be shared. In such embodiments, the preamble-like signal may be prioritized over the uplink data signal so that the preamble-like signal is transmitted with a designated power, and the transmit power of the uplink data signal is reduced to not exceed a total available transmit power. In such embodiments, a good reception quality of the preamble-like signal may be made. Having good reception quality for the preamble-like signa may be more important than good reception quality of the uplink data transmission for the RACH procedure. In various embodiments, if a preamble is detected successfully but an uplink data transmission cannot be decoded correctly by a gNB, the gNB may still be aware that a RACH procedure has been initiated by the UE, and may request a retransmission of the uplink data.

In certain embodiments, to determine a transmit power of an uplink data transmission, a UE may use the same power control parameters for calculating a transmit power $P_{PUSCH,b,f,c}(i,j,q_d,1)$ of the uplink transmission in step 1 of the 2-step RACH procedure as the power control parameters used for a msg3 PUSCH transmission. The power control parameters may include $P_{O\_PUSCH,b,f,c}$, $\alpha_{b,f,c}$, $PL_{b,f,c}(q_d)$. In such embodiments, the PUSCH transmission in step 1 of the 2-step RACH procedure may be treated as a msg3 PUSCH transmission from a power control perspective. In various embodiments, separate power control parameters may be defined for a PUSCH transmission in step 1 of a 2-step RACH procedure (e.g., separate values are defined for $P_{O\_PUSCH,b,f,c}$, $\alpha_{b,f,c}$, $PL_{b,f,c}(q_d)$ to satisfy different requirements in terms of reliability (e.g., BLER) or latency). In various embodiments, the following formula may be used:

$$P_{PUSCH,b,f,c}(i, j, q_d, l) = \min\left\{ \begin{array}{l} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{array} \right\}$$

In some embodiments, if a UE is not provided with a higher layer parameter P0-PUSCH-AlphaSet or for a msg3 PUSCH transmission, j=0, $P_{O\_UE\_PUSCH,f,c}(0)=0$, and $P_{O\_NOMINAL\_PUSCH,f,c}(0)=P_{O\_PRE}+\Delta_{PREAMBLE\_Msg3}$, where the parameter preambleReceivedTargetPower (for $P_{O\_PRE}$) and msg3-DeltaPreamble (for $\Delta_{PREAMBLE\_Msg3}$) are provided by higher layers for carrier f of serving cell c.

For $\alpha_{b,f,c}(j)$, j=0 and $\alpha_{b,f,c}(0)$ is a value of higher layer parameter msg3-Alpha, when provided; otherwise, $\alpha_{b,f,c}(0)=1$. $M_{RB,b,f,c}^{PUSCH}(i)$ is the bandwidth of the PUSCH resource assignment expressed in number of resource blocks for PUSCH transmission occasion i on UL BWP b of carrier f of serving cell c and μ may be predefined. $PL_{b,f,c}(q_d)$ is a downlink path-loss estimate in dB calculated by the UE using reference signal (RS) index $q_d$ for a DL BWP that is linked with UL BWP b of carrier f of serving cell c.

If the UE is not provided higher layer parameter PUSCH-PathlossReferenceRS and before the UE is provided dedicated higher layer parameters, the UE calculates $PL_{b,f,c}(q_d)$ using a RS resource from the SS/PBCH block index that the UE obtains higher layer parameter MasterInformationBlock.

If the UE is configured with a number of RS resource indexes up to the value of higher layer parameter maxNrof-PUSCH-PathlossReferenceRSs and a respective set of RS configurations for the number of RS resource indexes by higher layer parameter PUSCH-PathlossReferenceRS. The set of RS resource indexes can include one or both of a set of SS/PBCH block indexes, each provided by higher layer parameter ssb-Index when a value of a corresponding higher layer parameter pusch-PathlossReferenceRS-Id maps to a SS/PBCH block index, and a set of CSI-RS resource indexes, each provided by higher layer parameter csi-RS-Index when a value of a corresponding higher layer parameter pusch-PathlossReferenceRS-Id maps to a CSI-RS resource index. The UE identifies a RS resource index in the set of RS resource indexes to correspond either to a SS/PBCH block index or to a CSI-RS resource index as provided by higher layer parameter pusch-PathlossReferenceRS-Id in PUSCH-PathlossReferenceRS.

If the PUSCH is an Msg3 PUSCH, the UE uses the same RS resource index as for a corresponding PRACH transmission.

$PL_{b,f,c}(q_d)$, $PL_{f,c}(q_d)$=referenceSignalPower—higher layer filtered RSRP, where referenceSignalPower is provided by higher layers and RSRP is defined in [7, TS 38.215] for the reference serving cell and the higher layer filter configuration is defined in [12, TS 38.331] for the reference serving cell.

For j=0, referenceSignalPower is provided by higher layer parameter ss-PBCH-BlockPower. For j>0, referenceSignalPower is configured by either higher layer parameter ss-PBCH-BlockPower or, when periodic CSI-RS transmission is configured, by higher layer parameter powerControlOffsetSS providing an offset of the CSI-RS transmission power relative to the SS/PBCH block transmission power.

$\Delta_{TF,b,f,c}(i)=10 \log_{10}((2^{BPRE \cdot K_S}-1) \cdot \beta_{offset}^{PUSCH})$ for $K_S=1.25$ and $\Delta_{TF,b,f,c}(i)=0$ for $K_S=0$ where $K_S$ is provided by higher layer parameter deltaMCS provided for each UL BWP b of each carrier f and serving cell c. If the PUSCH transmission is over more than one layer [6, TS 38.214], $\Delta_{TF,b,f,c}(i)=0$. BPRE and $\beta_{offset}^{PUSCH}$, for each UL BWP b of each carrier f and each serving cell c, are computed as below.

$$BPRE = \sum_{r=0}^{C-1} K_r / N_{RE}$$

for PUSCH with UL-SCH data and $BPRE=O_{CSI}/N_{RE}$ for CSI transmission in a PUSCH without UL-SCH data, where C is the number of code blocks, K is the size for code block r, $O_{CSI}$ is the number of CSI part 1 bits including CRC bits, and $N_{RE}$ is the number of resource elements determined as $$N_{RE} = M\frac{PUSCH}{RB, b, f, c}(i) \cdot \sum_{j=0}^{N\frac{PUSCH}{symb,b,f,c}(i)-1} N\frac{RB}{sc, data}(i, j),$$

where $$N\frac{PUSCH}{symb, b, f, c}(i),$$

is the number of symbols for PUSCH transmission occasion i on UL BWP b of carrier f of serving cell c, $$N\frac{RB}{sc, data}(i, j)$$

is a number of subcarriers excluding DM-RS subcarriers in PUSCH symbol $$0 \le j \le N\frac{PUSCH}{symb, b, f, c}(i),$$

and C, $K_r$ are defined in [5, TS 38.212].

$\beta_{offset}^{PUSCH}=1$ when the PUSCH includes UL-SCH data and $\beta_{offset}^{PUSCH}=\beta_{offset}^{CSI,1}$ when the PUSCH includes CSI and does not include UL-SCH data.

In certain embodiments, instead of reducing a power of an uplink data transmission, a UE may defer the uplink data transmission to a later slot if insufficient power is available for transmission of the preamble-like signal and the uplink data in the same slot. In some embodiments, to avoid creating transmission gaps on an unlicensed carrier, it may be advantageous if a UE defers an uplink data transmission to a next slot after a slot used to transmit a preamble-like signal so that the preamble-like signal and uplink data are transmitted in adjacent slots. In one embodiment, a gNB performs a blind detection of uplink data at expected resources in the same slot and one or more slots after a detected preamble-like signal. In another embodiment, a preamble-like signal indicates whether uplink data is transmitted in the same slot, or deferred to a later slot. For example, a plurality of preamble-like signals forms two or more sets in which the transmission of a preamble-like signal from a first set indicates that the uplink data is transmitted in the same slot as the preamble-like signal. In such an example, if the preamble-like signal is from a second set, this indicates that transmission of the uplink data is deferred to a later slot than the preamble-like signal (e.g., to the next slot). As may be appreciated, partitioning of the preamble-like signals to sets may be defined in a communication system, or configured by a network (e.g., by broadcast in system information or by dedicated configuration signals).

In various embodiments, a timing advance value used for an uplink transmission in step 1 of a 2-step RACH procedure may be stored and maintained $N_{TA}$ in a UE for a serving cell on which the uplink transmission and a preamble transmission take place. It should be noted that if a TAT expires, a UE maintains $N_{TA}$. In certain configurations, the UE is only allowed to perform a PRACH transmission if TAT is expired. In some embodiments, the UE performs an uplink transmission on PUSCH, e.g. in step 1 of a 2-step RACH procedure, if the TAT is expired. In some embodiments, a UE uses $N_{TA}=0$ for an uplink transmission in step 1 of a 2-step RACH procedure. In such embodiments, a preamble transmission and the uplink transmission may use the same timing advance value.

As may be appreciated, a UE, before it performs transmission of step 1 of a 2-step RACH procedure, may determine which resources may be used for transmitting a preamble and an uplink transmission.

In one embodiment, PRACH resources are determined as in a 4-step RACH procedure (e.g., using RACH-ConfigGeneric parameters broadcasted as part of SIB1 in 5G NR). It should be noted that parameters used to determine PUSCH resources may be broadcast specifically for the purpose of transmitting step 1 of a 2-step RACH procedure. Accordingly, the PUSCH resources to be used by the UE may have a linking to chosen PRACH resources. The linking may be accomplished using one or more of the following offsets: 1) frequency offset, O_f: offset of lowest PUSCH transmission occasion in a frequency domain with respective to PRACH resources defined by msg1-FrequencyStart in 5G NR system; and/or 2) time offset, T_f: offset of lowest PUSCH transmission occasion in time domain with respective to PRACH transmission occasion chosen by the UE.

Figure 6:
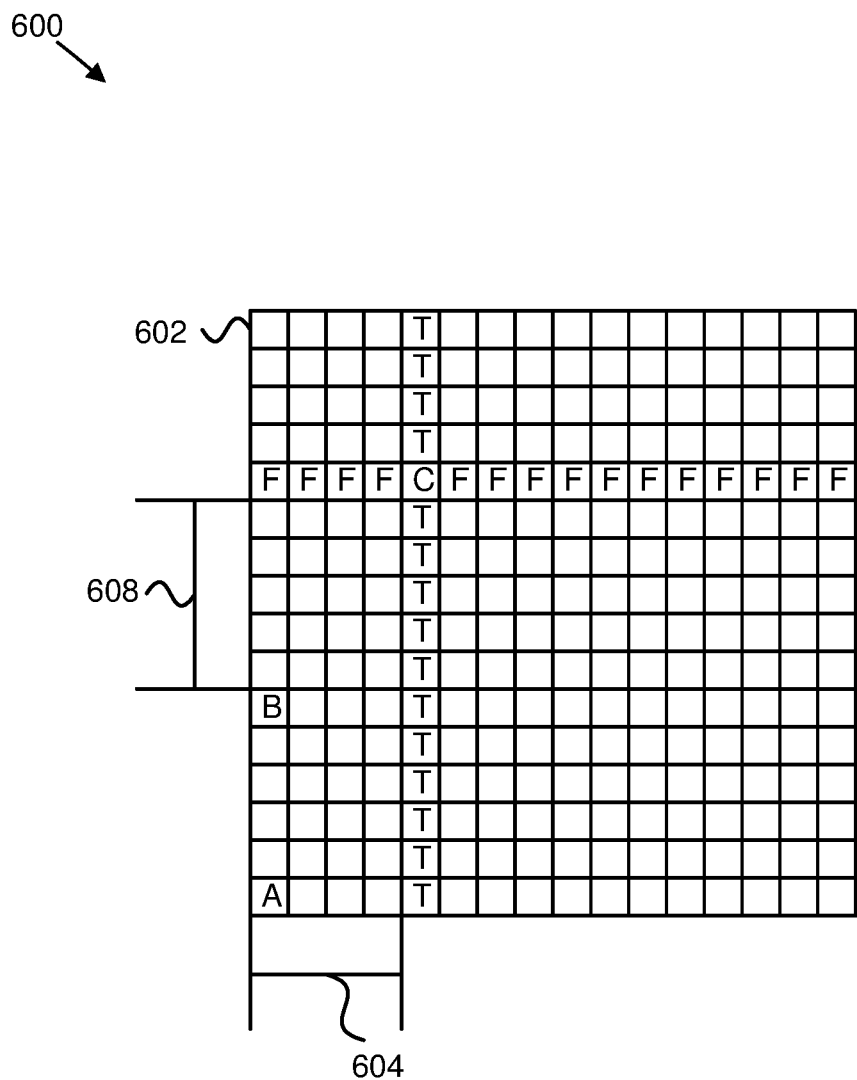
FIG. 6 is a resource diagram illustrating a time offset and a frequency offset.

FIG. 6 is a resource diagram 600 illustrating a time offset and a frequency offset. The resource diagram 600 includes a 16×16 grid of resource elements 602. One resource element 602 is PRB0 "A", another resource element 602 is the PRACH resource "B". A time offset 604 "T_f" is defined relative to the PRACH resource B to indicate a lowest time "T" in the time domain for a PUSCH transmission. This is illustrated by the column of resource elements 602 T. A frequency offset 608 "O_f" is defined relative to the PRACH resource B to indicate a lowest frequency "F" in the frequency domain for a PUSCH transmission. This is illustrated by the row of resource elements 602 F. The intersection of the lowest time T and the lowest frequency F is illustrated by resource element 602 "C".

As may be appreciated, a time offset may be a value in a number of symbols, a number of slots, or in milliseconds.

In certain embodiments, more than one set of O_f and T_f may be broadcast such that for one preamble ID or group of preambles IDs, one specific set of O_f and T_f may be used. For example, if 2 sets of O_f and T_f are broadcast then a first half of the preambles used in this cell (e.g., 0 . . . 31) may use the first set of O_f and T_f and the second half of the preambles used in this cell (e.g., 32 . . . 63) may use the second set of O_f and T_f. As may be appreciated, though broadcasting has been indicated above as the signaling mechanism, a dedicated RRC signaling or specified values may also be used (e.g., for a non-initial random access procedure).

In various embodiments, a network may configure how many PRBs are used for transmitting PUSCH of step 1 of a 2-step RACH procedure using RRC signaling. In certain embodiments, physical layer parameters like MCS may be specified or configured using RRC signaling for transmitting the PUSCH of step 1 of a 2-step RACH procedure.

In some embodiments, a UE decides whether to start a 2-step RACH procedure or a legacy 4-step RACH procedure once an RACH procedure has been triggered depending on certain criteria. In various embodiments, a UE may determine whether to start a 2-step RACH procedure or a 4-step RACH procedure based on e.g., its power status. In such embodiments, the UE calculates a required transmission power for both a preamble transmission $P_{preamble}$ according to the power control formula specified for preamble transmission and for an uplink transmission $P_{UL}$ according to a power control formula specified for the uplink transmission. In certain embodiments, if the sum of $P_{preamble}$ and $P_{UL}$ doesn't exceed a UE's total maximum transmission power (e.g., $P_{cmax,c}$), a UE starts a 2-step RACH procedure, otherwise the UE uses the 4-step RACH procedure. In one embodiment, a criterion for determining whether to use a 2-step RACH procedure or a 4-step RACH procedure may be a size of data to be transmitted in an UL transmission (e.g., if the size of the data is above a certain configured threshold, the UE may use the 4-step RACH procedure). In another embodiment, a network entity (e.g., such as a gNB) configures whether a UE is enabled, allowed, and/or obliged to perform a 2-step RACH procedure and/or a 4-step RACH procedure in a current cell. In such embodiment, the configuration may be made per RACH type (e.g., the 2-step RACH procedure is used for handover situations and for scheduling request purposes the 4-step RACH procedure is used). In certain embodiments, a PDCCH order or a RRC message ordering a handover may indicate whether to use a legacy contention-free RACH procedure or a 2-step RACH procedure (e.g., a handover complete message may be included in step 1 of the 2-step RACH procedure). In various embodiments, a configuration and/or a specification may indicate that a 2-step RACH procedure is used in an unlicensed spectrum. In certain embodiments, use of a 2-step RACH procedure or a 4-step RACH procedure may be tied to COT (e.g., determining to use either the 2-step RACH procedure or the 4-step RACH procedure based on whether the COT is above and/or below certain threshold).

In some embodiments, a UE is enabled to use a channel access Type 2 (e.g., implying a fixed or shorter sensing interval for a CCA procedure) for transmission of a preamble-like signal and an uplink transmission in step 1 of a 2-step RACH procedure.

Figure 7:
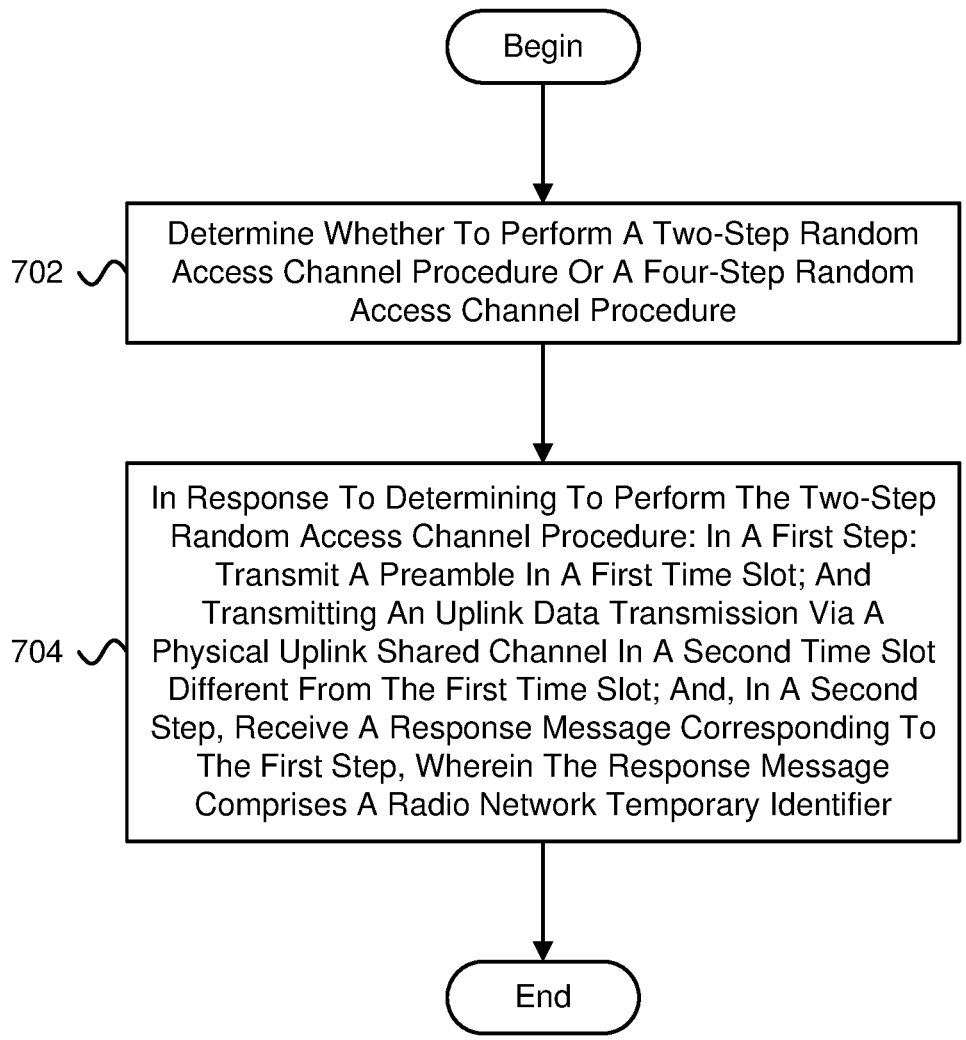
FIG. 7 is a flow chart diagram illustrating one embodiment of a method for performing a two-step random access channel procedure.

FIG. 7 is a flow chart diagram illustrating one embodiment of a method 700 for performing a two-step random access channel procedure. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include determining 702 whether to perform a two-step random access channel procedure or a four-step random access channel procedure. In some embodiments, the method 700 includes, in response to determining to perform the two-step random access channel procedure: in a first step: transmitting 704 a preamble in a first time slot; and transmitting an uplink data transmission via a physical uplink shared channel in a second time slot different from the first time slot; and, in a second step, receiving a response message corresponding to the first step, wherein the response message comprises a radio network temporary identifier.

In certain embodiments, the method 700 further comprises monitoring during a response window for the response message. In some embodiments, the radio network temporary identifier for the two-step random access channel procedure is calculated using a first formula, and a radio network temporary identifier for the four-step random access channel procedure is calculated using a second formula different from the first formula. In various embodiments, the uplink data transmission comprises a medium access control physical data unit.

In one embodiment, the method 700 further comprises storing the medium access control physical data unit in a buffer. In certain embodiments, the medium access control physical data unit is stored in the buffer in response to switching from the two-step random access channel procedure to the four-step random access channel procedure. In some embodiments, the method 700 further comprises delaying for an offset time between transmission of the preamble and transmission of the uplink data transmission.

In various embodiments, the offset time corresponds to a subcarrier spacing. In one embodiment, determining whether to perform the two-step random access channel procedure or the four-step random access channel procedure comprises determining whether to perform the two-step random access channel procedure or the four-step random access channel procedure based on a predetermined factor. In certain embodiments, the predetermined factor comprises a power status.

In some embodiments, the method 700 further comprises receiving information configuring a requirement for performing the two-step random access channel procedure. In various embodiments, the information indicates that the two-step random access channel procedure is allowed. In one embodiment, the information indicates that the two-step random access channel procedure is required.

Figure 8:
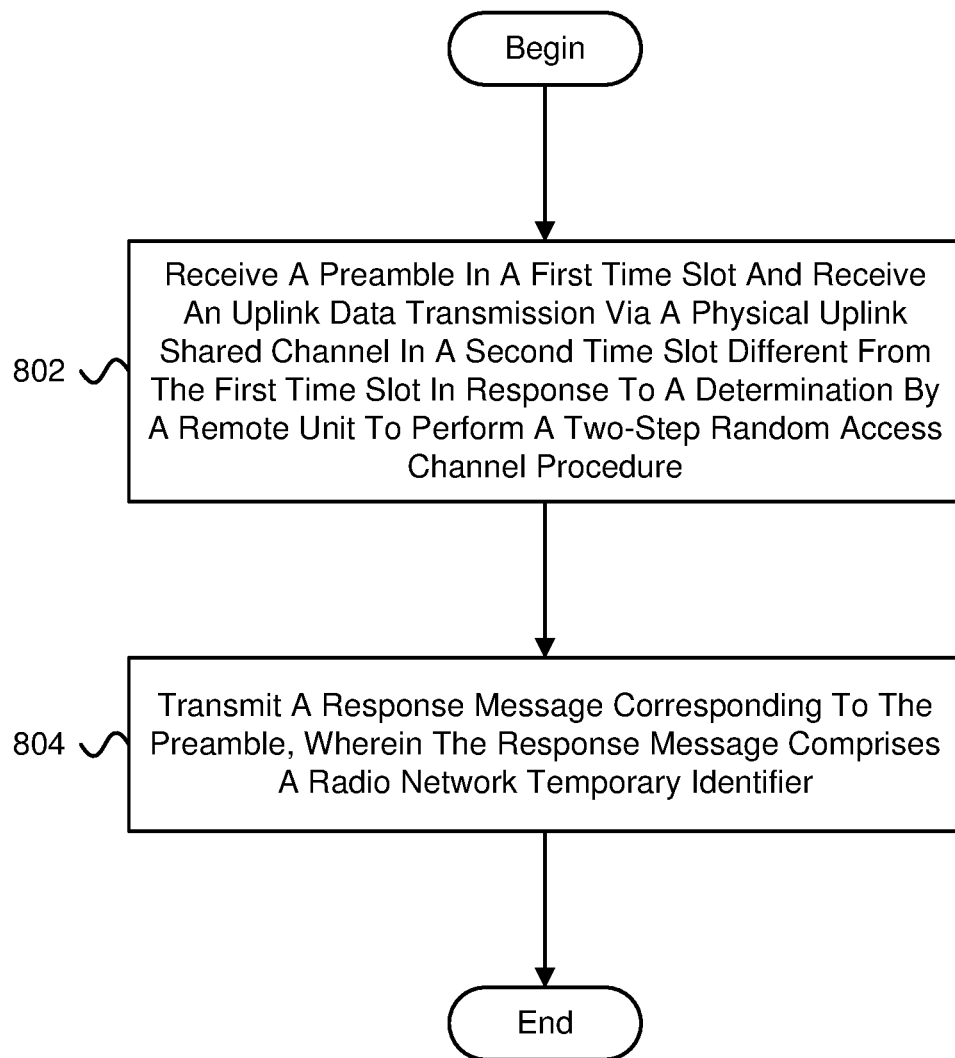
FIG. 8 is a flow chart diagram illustrating another embodiment of a method for performing a two-step random access channel procedure.

FIG. 8 is a flow chart diagram illustrating another embodiment of a method 800 for performing a two-step random access channel procedure. In some embodiments, the method 800 is performed by an apparatus, such as the network unit 104. In certain embodiments, the method 800 may be performed by a processor executing program code, for example, a microcontroller, a microprocessor, a CPU, a GPU, an auxiliary processing unit, a FPGA, or the like.

The method 800 may include receiving 802 a preamble in a first time slot and receiving an uplink data transmission via a physical uplink shared channel in a second time slot different from the first time slot in response to a determination by a remote unit to perform a two-step random access channel procedure. In some embodiments, the method 800 includes transmitting 804 a response message corresponding to the preamble, wherein the response message comprises a radio network temporary identifier.

In certain embodiments, the radio network temporary identifier for the two-step random access channel procedure is calculated using a first formula, and a radio network temporary identifier for a four-step random access channel procedure is calculated using a second formula different from the first formula. In some embodiments, the uplink data transmission comprises a medium access control physical data unit. In various embodiments, an offset time delay is between receiving the preamble and receiving the uplink data transmission.

In one embodiment, the offset time corresponds to a subcarrier spacing. In certain embodiments, the method 800 further comprises transmitting information configuring a requirement for performing the two-step random access channel procedure. In some embodiments, the information indicates that the two-step random access channel procedure is allowed. In various embodiments, the information indicates that the two-step random access channel procedure is required.

In one embodiment, a method comprises: determining whether to perform a two-step random access channel procedure or a four-step random access channel procedure; and, in response to determining to perform the two-step random access channel procedure: in a first step: transmitting a preamble in a first time slot; and transmitting an uplink data transmission via a physical uplink shared channel in a second time slot different from the first time slot; and, in a second step, receiving a response message corresponding to the first step, wherein the response message comprises a radio network temporary identifier.

In certain embodiments, the method further comprises monitoring during a response window for the response message.

In some embodiments, the radio network temporary identifier for the two-step random access channel procedure is calculated using a first formula, and a radio network temporary identifier for the four-step random access channel procedure is calculated using a second formula different from the first formula.

In various embodiments, the uplink data transmission comprises a medium access control physical data unit.

In one embodiment, the method further comprises storing the medium access control physical data unit in a buffer.

In certain embodiments, the medium access control physical data unit is stored in the buffer in response to switching from the two-step random access channel procedure to the four-step random access channel procedure.

In some embodiments, the method further comprises delaying for an offset time between transmission of the preamble and transmission of the uplink data transmission.

In various embodiments, the offset time corresponds to a subcarrier spacing.

In one embodiment, determining whether to perform the two-step random access channel procedure or the four-step random access channel procedure comprises determining whether to perform the two-step random access channel procedure or the four-step random access channel procedure based on a predetermined factor.

In certain embodiments, the predetermined factor comprises a power status.

In some embodiments, the method further comprises receiving information configuring a requirement for performing the two-step random access channel procedure.

In various embodiments, the information indicates that the two-step random access channel procedure is allowed.

In one embodiment, the information indicates that the two-step random access channel procedure is required.

In one embodiment, an apparatus comprises: a processor that determines whether to perform a two-step random access channel procedure or a four-step random access channel procedure; a transmitter; and a receiver, wherein in response to determining to perform the two-step random access channel procedure: in a first step, the transmitter: transmits a preamble in a first time slot; and transmits an uplink data transmission via a physical uplink shared channel in a second time slot different from the first time slot; and in a second step, the receiver receives a response message corresponding to the first step, wherein the response message comprises a radio network temporary identifier.

In certain embodiments, the processor monitors during a response window for the response message.

In some embodiments, the radio network temporary identifier for the two-step random access channel procedure is calculated using a first formula, and a radio network temporary identifier for the four-step random access channel procedure is calculated using a second formula different from the first formula.

In various embodiments, the uplink data transmission comprises a medium access control physical data unit.

In one embodiment, the apparatus further comprising a buffer that stores the medium access control physical data unit.

In certain embodiments, the medium access control physical data unit is stored in the buffer in response to switching from the two-step random access channel procedure to the four-step random access channel procedure.

In some embodiments, the processor delays for an offset time between transmission of the preamble and transmission of the uplink data transmission.

In various embodiments, the offset time corresponds to a subcarrier spacing.

In one embodiment, the processor determines whether to perform the two-step random access channel procedure or the four-step random access channel procedure by determining whether to perform the two-step random access channel procedure or the four-step random access channel procedure based on a predetermined factor.

In certain embodiments, the predetermined factor comprises a power status.

In some embodiments, the receiver receives information configuring a requirement for performing the two-step random access channel procedure.

In various embodiments, the information indicates that the two-step random access channel procedure is allowed.

In one embodiment, the information indicates that the two-step random access channel procedure is required.

In one embodiment, a method comprises: receiving a preamble in a first time slot and receiving an uplink data transmission via a physical uplink shared channel in a second time slot different from the first time slot in response to a determination by a remote unit to perform a two-step random access channel procedure; and transmitting a response message corresponding to the preamble, wherein the response message comprises a radio network temporary identifier.

In certain embodiments, the radio network temporary identifier for the two-step random access channel procedure is calculated using a first formula, and a radio network temporary identifier for a four-step random access channel procedure is calculated using a second formula different from the first formula.

In some embodiments, the uplink data transmission comprises a medium access control physical data unit.

In various embodiments, an offset time delay is between receiving the preamble and receiving the uplink data transmission.

In one embodiment, the offset time corresponds to a subcarrier spacing.

In certain embodiments, the method further comprises transmitting information configuring a requirement for performing the two-step random access channel procedure.

In some embodiments, the information indicates that the two-step random access channel procedure is allowed.

In various embodiments, the information indicates that the two-step random access channel procedure is required.

In one embodiment, an apparatus comprises: a receiver that receives a preamble in a first time slot and receiving an uplink data transmission via a physical uplink shared channel in a second time slot different from the first time slot in response to a determination by a remote unit to perform a two-step random access channel procedure; and a transmitter that transmits a response message corresponding to the preamble, wherein the response message comprises a radio network temporary identifier.

In certain embodiments, the radio network temporary identifier for the two-step random access channel procedure is calculated using a first formula, and a radio network temporary identifier for a four-step random access channel procedure is calculated using a second formula different from the first formula.

In some embodiments, the uplink data transmission comprises a medium access control physical data unit.

In various embodiments, an offset time delay is between receiving the preamble and receiving the uplink data transmission.

In one embodiment, the offset time corresponds to a subcarrier spacing.

In certain embodiments, the transmitter transmits information configuring a requirement for performing the two-step random access channel procedure.

In some embodiments, the information indicates that the two-step random access channel procedure is allowed.

In various embodiments, the information indicates that the two-step random access channel procedure is required.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   receiving configuration information from a network device indicating whether two-step random access resources are configured and whether four-step random access resources are configured;
   determining whether to perform a two-step random access channel procedure or a four-step random access channel procedure based on a reference signal received power of a downlink pathloss reference and the configuration information, wherein the two-step random access channel procedure is determined to be performed in response to the reference signal received power being greater than a configured threshold and the configuration information indicating that two-step random access resources and four-step random access resources are configured; and
   in response to determining to perform the two-step random access channel procedure:
   in a first step:
     transmitting a preamble in a first time instance; and
     transmitting an uplink data transmission via a physical uplink shared channel in a second time instance different from the first time instance; and
   in a second step, monitoring for a response message corresponding to the first step during a time window, wherein the response message is indicated by a radio network temporary identifier.

2. The method of claim 1, wherein the radio network temporary identifier for the two-step random access channel procedure is calculated using a first formula, and a radio network temporary identifier for the four-step random access channel procedure is calculated using a second formula different from the first formula.

3. The method of claim 1, wherein a physical uplink shared channel resource used for the uplink data transmission in the first step is linked to the preamble transmitted in the first step.

4. The method of claim 1, wherein the uplink data transmission comprises a medium access control protocol data unit.

5. The method of claim 4, further comprising storing the medium access control protocol data unit in a first buffer.

6. The method of claim 5, wherein the medium access control protocol data unit is stored in a second buffer in response to switching from the two-step random access channel procedure to the four-step random access channel procedure.

7. The method of claim 6, wherein the second buffer is a msg3 buffer.

8. The method of claim 1, wherein the transmission of the preamble and the transmission of the uplink data transmission occur in different slots.

9. The method of claim 1, wherein an offset between the transmission of the preamble and transmission of the uplink data transmission is configured by a network entity.

10. An apparatus comprising a user equipment, the apparatus further comprising:
- a receiver that receives configuration information from a network device indicating whether two-step random access resources are configured and whether four-step random access resources are configured;
- a processor that determines whether to perform a two-step random access channel procedure or a four-step random access channel procedure based on a reference signal received power of a downlink pathloss reference and the configuration information, wherein the two-step random access channel procedure is determined to be performed in response to the reference signal received power being greater than a configured threshold and the configuration information indicating that two-step random access resources and four-step random access resources are configured; and
- a transmitter;
- wherein in response to determining to perform the two-step random access channel procedure:
  - in a first step, the transmitter:
    - transmits a preamble in a first time instance; and
    - transmits an uplink data transmission via a physical uplink shared channel in a second time instance different from the first time instance; and
  - in a second step, the processor monitors for a response message corresponding to the first step during a time window, wherein the response message is indicated by a radio network temporary identifier.

11. The apparatus of claim 10, wherein the radio network temporary identifier for the two-step random access channel procedure is calculated using a first formula, and a radio network temporary identifier for the four-step random access channel procedure is calculated using a second formula different from the first formula.

12. The apparatus of claim 10, wherein a physical uplink shared channel resource used for the uplink data transmission in the first step is linked to the preamble transmitted in the first step.

13. The apparatus of claim 10, wherein the receiver receives information configuring a requirement for performing the two-step random access channel procedure.

14. The apparatus of claim 13, wherein the information indicates that the two-step random access channel procedure is allowed.

15. An apparatus comprising:
- a transmitter that transmits configuration information from a network device indicating whether two-step random access resources are configured and whether four-step random access resources are configured; and
- a receiver that receives a preamble in a first time instance and receives an uplink data transmission via a physical uplink shared channel in a second time instance different from the first time instance in response to a determination by a remote unit to perform a two-step random access channel procedure, wherein the determination by the remote unit to perform the two-step random access channel procedure is based on a reference signal received power of a downlink pathloss reference and the configuration information, and the two-step random access channel procedure is determined to be performed in response to the reference signal received power being greater than a configured threshold and the configuration information indicating that the two-step random access channel procedure and the four-step random access channel procedure are configured;
- wherein the transmitter transmits a response message corresponding to the preamble, and the response message comprises a radio network temporary identifier.

16. The apparatus of claim 15, wherein the transmitter transmits information configuring a requirement for performing the two-step random access channel procedure.

17. The apparatus of claim 16, wherein the information indicates that the two-step random access channel procedure is allowed.

18. The apparatus of claim 16, wherein the information indicates that the two-step random access channel procedure is required.

19. The apparatus of claim 15, wherein the radio network temporary identifier for the two-step random access channel procedure is calculated using a first formula, and a radio network temporary identifier for the four-step random access channel procedure is calculated using a second formula different from the first formula.

20. The apparatus of claim 15, wherein a physical uplink shared channel resource used for the uplink data transmission is linked to the preamble.

* * * * *